Nov. 25, 1930.  F. RIEBER  1,782,445
SYSTEM AND METHOD FOR GEOPHYSICAL EXPLORATION
Filed June 24, 1927  2 Sheets-Sheet 1

INVENTOR
Frank Rieber
BY
John Flam
HIS ATTORNEY

Nov. 25, 1930.  F. RIEBER  1,782,445
SYSTEM AND METHOD FOR GEOPHYSICAL EXPLORATION
Filed June 24, 1927    2 Sheets-Sheet 2
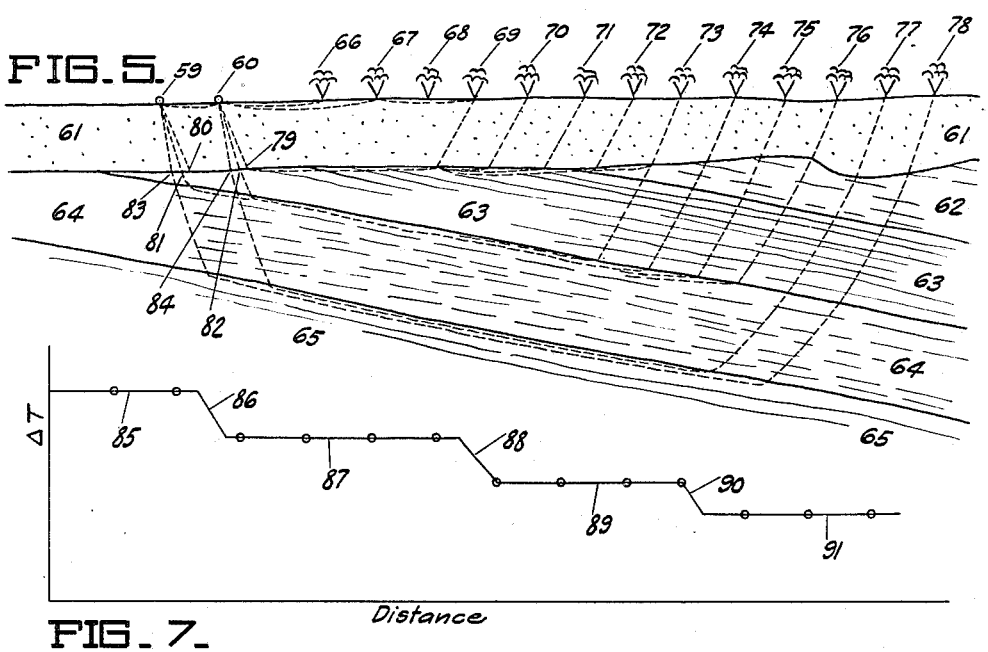
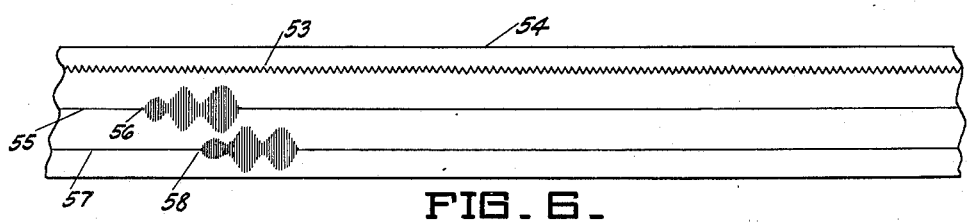
INVENTOR
Frank Rieber
BY John Flam
HIS ATTORNEY Patented Nov. 25, 1930

1,782,445

UNITED STATES PATENT OFFICE

FRANK RIEBER, OF SAN FRANCISCO, CALIFORNIA

SYSTEM AND METHOD FOR GEOPHYSICAL EXPLORATION

Application filed June 24, 1927. Serial No. 201,161.

This invention relates to geophysical exploration; that is, to systems and processes whereby knowledge is gleaned of the physical character of the earth's crust at the locality of the exploration.

Geophysical exploration of this general sort has been proposed and used in the past, and especially wherein dynamite or other forms of explosives has been detonated at the earth's surface or just below it, and times of arrival of the first vibratory shocks have been noted at spaced points arranged in a straight line extending through the locality where the explosion occurred. A time-travel curve is then plotted, showing the time taken for the shocks to travel to each of the spaced points, and from this curve and by the aid of empirical data, it has been attempted to deduce facts regarding the strata under investigation.

Alternatively, it has also been proposed to set up a receiver and recorder at a fixed point, and to set off explosions at varying distances along a straight line from this point. Travel-time curves can also be plotted in the same way, and exhibiting the same characteristics as the curves plotted in the first method.

In attempting to interpret such plotted curves, use has been made of experience gained in connection with earthquakes. It has long been recognized, in the study of earthquake waves, that mechanical vibration waves propagated through the earth's crust and produced at a common source, would not reach distant points in times proportional to the distances between these points and the source. For example, if there are three seismographs located respectively 100, 200, and 300 miles from a source of disturbances, it would be found that the first arrival of the waves at the 200 mile station would take place in a time interval somewhat less than twice the time interval it took to travel to the 100 mile station; and the time interval for the first arrival at the 300 mile station would be considerably less than three times the time interval of travel to the 100 mile station.

Considerable study has been spent by seismologists on these effects; and thereby it was discovered that the travel-time curves could be interpreted in terms of variations in the structure of the surface layers of the earth. These studies were later found adaptable to geophysical explorations, in which artificial shocks were produced, as set forth hereinbefore.

It has been found that where travel-time curves were plotted for considerable distances, these curves exhibited irregularities that made them inapt for accurate study. This was explained on the basis that as the distances increased between the receiving station and the source of vibrations and as consequently more and more strata were encountered by the vibrations, the paths thereof became more and more complex, yielding data difficult of analysis.

It is one of the objects of my invention to make it possible to secure readily interpretable data from artificially produced shocks.

It is another object of my invention to make it possible to secure complete data with relatively few detonations.

It is still another object of my invention to provide a system for geophysical explorations, which yields extreme accuracy.

It is still another object of my invention to provide such a system, the operation of which is affected by a minimum number of uncontrollable factors that enter into the plotting of the results obtained.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Fig. 5 is a diagram of a complex system of earth strata and of the means utilized by me in accordance with my invention to secure readily interpretable data;

Fig. 6 is a picture of a portion of the record made by the receivers of my invention when used in connection with the investigation of the earth structure shown in Fig. 5; and Fig. 7 is a curve or graph plotted from the data recorded in accordance with my invention and exhibiting the advantages thereof.

Figure 1:
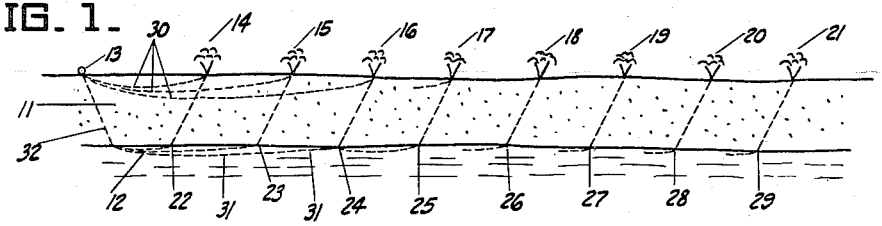
Figure 1 is a sectional diagram illustrating a simple crust structure that is capable of rather thorough investigation by methods now known, and indicated herein to point out more clearly the attendant restrictions and drawbacks of such methods.

In Fig. 1 there is shown a layer 11 of alluvium covering the surface of the earth, below which there is a more compact stratum 12. In this simple form of crust structure, the method of the prior art can be advantageously used. A seismograph or its equivalent is located at 13, and serves to record shocks produced by explosions occurring at spaced points 14 to 21. Waves from nearby explosions, such as from points 14, 15, and 16, will reach the recording seismograph 13 most quickly by proceeding through the alluvium 11 near the surface thereof. The more distant explosions, however, find a better path for their transmitted vibrations, through the lower, more compacted stratum 12, as indicated at points 22 to 29, showing where the waves penetrate this stratum. The paths of travel of the waves from the nearby stations are indicated by the lines 30; and the paths of travel of the waves from the more distant station are indicated by lines 31. These lines 31 are substantially parallel to the interface between layers 11 and 12, since their much higher velocity in the more compact material 12 causes them to be bent or refracted to the parallel paths shown.

Of course some of the energy from these waves is continually being refracted upwards; and eventually, as the wave front progresses, a refraction such as indicated by line 32 will reach the seismograph 13. Since the velocity of the wave front is faster through medium 12, that path from any of the explosions 17, 18, 19, 20 or 21 is quicker which includes the interface between layers 11 and 12, instead of the path that proceeds only through layer 11.

Figure 2:
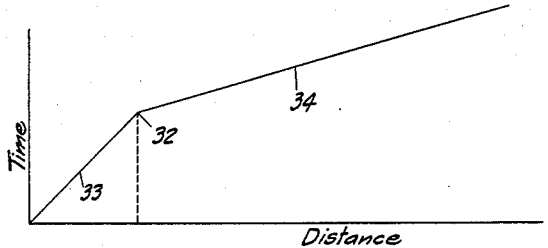
Fig. 2 is a travel-time curve plotted from data collected by the method utilized in connection with the system indicated in Fig. 1.

This phenomenon is clearly presented by the aid of a travel-time graph, such as shown in Fig. 2. In this graph, the abscissæ represent distances from receiver 13, and the ordinates, the time required for the vibrations to reach the said receiver. If layer 12 is parallel to the surface of the earth, the graph obtained would be as indicated—two straight lines 33 and 34 forming an angle at point 32. The line 33 represents the time travel of vibrations from points near the receiver 13, such as points 14 to 17, which vibrations can most quickly proceed along or near the earth's surface. The line 34 however, represents a faster rate of travel from the more distant points. Thus we can state that the velocity in medium 11 is a function of the slope of line 33 (in fact, the reciprocal of the slope); and the velocity in medium 12 is a similar function of the slope of line 34. By the aid of empirical data, and from observation on the graph of the distance where the velocity abruptly changes (represented by the abscissa of point 32), it is possible to derive an expression giving the depth of the layer 12.

The method just described is to some extent useful in connection with the examination of extremely simple strata formations such as illustrated in Fig. 1. But even in such cases, the accuracy of the results is greatly dependent on the accuracy with which time intervals may be measured. I shall now point out wherein such treatment as herein set forth will fail to give reliable results for exploring the usual more complicated crust structure.

Figure 3:
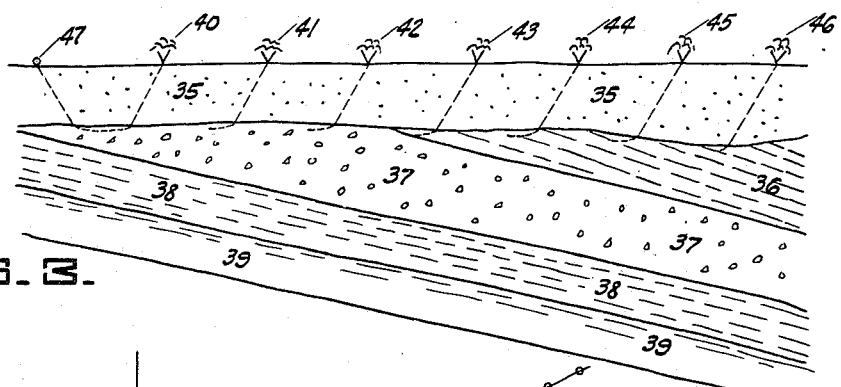
Fig. 3 is a diagram similar to Fig. 1, but of a more complicated structure, and is used to point out more clearly the difficulties encountered with the systems and methods of the prior art.

In Fig. 3, there is diagrammatically illustrated such an example of the earth's surface structure. In this instance the upper layer 35 of alluvium is shown as of irregular depth which of course is quite usual. This alluvial stratum is shown as superimposed on the planed off edges of the inclined strata 36, 37, 38 and 39. For illustrative purposes, we can assume that the vibrations transmitted through alluvium 35 have the lowest velocity; and those through layers 36, 37, 38 and 39 have increasing velocities. If it be attempted to use the same method of exploration as outlined in connection with Fig. 1, explosions can be set off at spaced points 40 to 46, whence vibrations are received at the receiver and recorder 47. The travel time graph thus obtained may present the graph of Fig. 4. In this graph, the branch 48 represents the time travel relation of the wave arriving through the alluvium 35; point 49 represents the point of change of velocity; branch 50 represents the time travel relation for the wave that is refracted through the surface of the exposed stratum 37; point 51 represents another point of velocity change; and 52 represents a large irregularity in the graph which might be caused by many factors, such as by the increased depth of the irregular alluvial covering under points 45 and 46. Such an irregular graph is difficult to interpret; and it is necessary to make supplementary investigations with additional lines of shock.

One of the improvements I am able to utilize in connection with investigations of this character relates to the accuracy with which the times can be recorded. The old form of seismograph is incapable of giving the required degree of accuracy. I shall now explain how this comes about.

When a shock or explosion occurs, there are several different kinds of waves propagated or radiated therefrom. Not all of these kinds can be advantageously used or recorded. As I have pointed out in some of my copending applications, the first result of a detonation of explosives gives rise first to a very sharp increase of pressure, transmitted as an abrupt pressure wave through the earth. Subsequently, the earth vibrates through a number of excursions, at a relatively slow rate. The fault with the usual seismographic equipment is that it fails to respond to the initial abrupt pressure wave, although it can record fairly effectively the subsequent slower vibrations. Since these subsequent vibrations persist for a long period in comparison with the first shocks, it is difficult to recognize the exact instant of their arrival. The stronger the subsequent waves become, the more readily is the first indication of these waves noted on the record. This has given rise to the erroneous although common opinion expressed by many investigators of explosive waves, that the speed of propagation of such waves depends in some degree upon the intensity of the initial explosion. By providing accurately responsive apparatus, especially to the initial abrupt shock, the accuracy of measurement of the time of travel of such elastic waves can be greatly improved. As can be expected, it has been found, when using such accurate apparatus, that the time of travel from a number of explosions at the same distance from a receiver is not measureably affected by wide variations in the intensity of the explosion.

Figure 4:
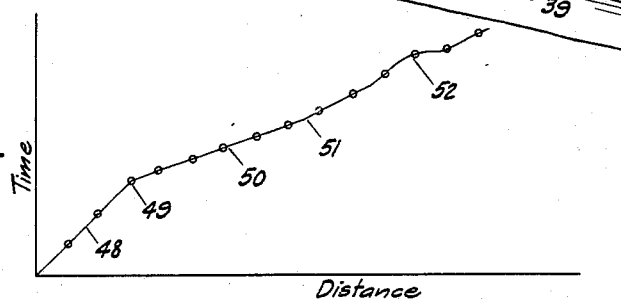
Fig. 4 is a travel-time curve that may be plotted from data collected by the method used in connection with the system indicated in Fig. 3, and exhibiting the undesired irregularities attributable to such methods.

By the aid of my invention, such irregularities as are indicated in Fig. 4 are obviated. This I am enabled to do by measuring, not the overall time of propagation of the waves, but rather the differences in the times that waves from any particular point 40 to 46 take to travel to two known, permanent points. It is evident that under such circumstances, the disturbing effects of such irregularities in the strata as are indicated at the right hand portion of Fig. 3 are nullified; for the time taken to travel through the irregular portion is the same for both times taken to travel to the two spaced points.

Therefore, in accordance with my invention, I set up, at a distance from the explosion to be used, two or more accurately spaced vibration receivers, preferably of the form described in my copending application.

These receivers record accurately, the instant of first arrival of the sharp detonation wave from an explosion. A record made by such receivers is indicated in Fig. 6. In this figure, the vibratory trace 53 along one edge of the film 54 serves as a timing graph, the vibrations being at known frequency, such as 1000. Thus each complete cycle along the timing graph represents one-one thousandth of a second. The record 55 is traced by the action of one of the receivers, showing the arrival of an abrupt impulse at the point 56. The record 57 is traced by the action of the other receiver, showing the arrival of an abrupt impulse at the point 58. To find the difference in times of arrivals, points 56 and 58 can be projected upon the timer graph 1, and an extremely accurate result can be obtained by noting the number of alternations between the projected points.

The manner in which the explosions are run off can be best understood from a consideration of Fig. 5. This figure represents a cross section of the earth's crust, similar to Fig. 3. In this figure, points 59 and 60 show the locations of two shock sensitive receivers of my invention, or of similar shock responsive means designed to detect the first sharp arriving vibration. The first layer 61 can be alluvial, underlaid by planed off strata 62, 63, 64 and 65.

A series of explosives can be set off at successively increasing distances, and in line with the receivers 59 and 60, as for example at points 66 to 78. The explosions from the nearby points 66, 67 and 68 can be assumed to find the shortest possible time of travel along or near the surface of the alluvium 61. Explosions from the points 69, 70, 71 and 72 all find their shortest arrival time along the interface between some of the lower strata and the overlying alluvial layer 61. These waves all will be refracted upwards to the receivers 59 and 60 from substantially the same points 79 and 80.

Explosions from points 73, 74, 75, and 76, however, find their shortest possible time of travel by refraction through the strata 61, 62, and 63, and into the interface between strata 63 and 64. They travel in this interface until they reach points 81 and 82, whence they are refracted through alluvium 61 to the receivers 59 and 60. All four of these explosions produce waves coming through points 81 and 82, although these waves come from differently located points, and regardless of the material they must pass through to get to the interface between strata 63 and 64. This is of great importance, because a measurement of the difference of time in arrival at stations 59 and 60 is due mainly to the known spacing of these stations, and is independent of the irregularities of the paths at a distance from these stations.

Similarly, it can be assumed that the waves produced by explosions at points 77 and 78 find their shortest possible time of travel when refracted downward into the interface between strata 64 and 65, when they are refracted at points 83 and 84, toward the receivers 59 and 60. Here again, the waves from both explosions at 77 and 78 arrive at the same points 83 and 84, regardless of the fact that waves from point 77 have passed through a much deeper amount of alluvium than those from point 78.

These differences in times of arrival can be plotted as a graph, against distances from the receivers to the points of explosion. Such a graph is shown in Fig. 7. In this graph, the portion 85 has ordinates which represent the time differences $\Delta T$, of arrival of waves from any of the stations 66, 67 or 68. The portion 86 shows that there is a break or discontinuity in these time differences, occasioned by the waves from points from the receivers taking a different kind of path than those from points 66, 67 and 68. The portion 87 has ordinates which represent the time differences $\Delta T$, of arrival of waves from the more distant stations 69, 70, 71, and 72. In this case, the velocity in the interface between strata 61 and 62 being greater than through alluvium 61, these ordinates are smaller than for portion 85. In both portions 85 and 87, however, the ordinates remain constant and definitely show that for the points of explosion corresponding to each of these portions, the waves have penetrated to the same interface. Similar discussions hold with respect to portions 89 and 91, corresponding respectively to the group of stations 73, 74, 75 and 76, and the group 77 and 78. The breaks 88 and 90 connect these portions together. As the first arriving waves penetrate deeper, they produce smaller and smaller time differences.

Now let us assume that by appropriate measurement, we know the velocity of the waves through the alluvium adjacent receivers 59 and 60; and that the distance between these receivers is accurately determined. Then from the time interval differences at which first arrivals reach the two receivers from any one of the explosion points, it is possible to determine the angle of emergence of these vibrations into the alluvium 61, immediately before they reach the receivers 59 and 60. These angles remain the same so long as the vibrations are arriving by refraction from the same layer, but will change abruptly as soon as the first arrivals find a shorter path from a succeeding stratum of higher velocity. From this data, and knowing the distance from the two receivers to each of the explosion points, it is possible to calculate the depth of the stratum from which the refractions are proceeding.

I claim:

1. In a system for geophysical exploration, a pair of spaced receivers, means for generating mechanical waves at a plurality of spaced points collinear with the receivers, and means for measuring the differences in times of arrival of the waves to the two receivers from any one of said points.

2. In a system for geophysical exploration, a pair of spaced receivers, these receivers being spaced a known distance apart, means for affecting said receivers by the aid of vibratory waves generated at any of a plurality of spaced points collinear with the receivers, and means associated with said receivers for measuring the difference in the times needed for the first arrivals of the waves to the receivers from any of said points.

3. The method of geophysical exploration which comprises transmitting a succession of elastic waves from a plurality of spaced points all collinear, and receiving the elastic waves and using the same to produce a record whereby measurements of the differences in the time of first arrival at a pair of spaced stations may be made, said stations being also collinear with the points.

In testimony whereof I have hereunto set my hand.

FRANK RIEBER.